United States Patent [19]
Chapin et al.

[11] Patent Number: 6,108,475
[45] Date of Patent: Aug. 22, 2000

[54] OPTICAL FIBER CABLE PRODUCTS HAVING A STRESS INDICATING CAPABILITY AND PROCESS FOR MAKING SAME

[75] Inventors: John T. Chapin, Alpharetta; Terry D. Mathis, Lilburn; Montri Viriyayuthakorn, Norcross, all of Ga.

[73] Assignee: Lucent Technologies Inc., Murray Hill, N.J.

[21] Appl. No.: 08/995,577

[22] Filed: Dec. 22, 1997

[51] Int. Cl.$^7$ .................................... G02B 6/44
[52] U.S. Cl. ..................... 385/128; 385/102; 264/1.29
[58] Field of Search .................... 385/126, 127, 385/128, 102, 103, 104, 105, 106, 107, 108; 283/81; 215/203, 250; 430/338; 220/359; 264/1.29

[56] References Cited

U.S. PATENT DOCUMENTS

| | | | |
|---|---|---|---|
| 3,923,198 | 12/1975 | Brochman | 220/359 |
| 3,999,946 | 12/1976 | Patel et al. | 422/56 |
| 4,489,841 | 12/1984 | Thompson | 215/203 |
| 4,513,087 | 4/1985 | Giuliani et al. | 436/96 |
| 4,557,505 | 12/1985 | Schaefer et al. | 283/81 |
| 4,792,053 | 12/1988 | Towns et al. | 215/250 |
| 4,864,144 | 9/1989 | McLaughlin et al. | 250/474.1 |
| 4,905,851 | 3/1990 | Thompson | 215/203 |
| 5,282,650 | 2/1994 | Smith et al. | 283/81 |
| 5,337,376 | 8/1994 | Ravetti et al. | 385/12 |
| 5,405,583 | 4/1995 | Goswami et al. | 422/86 |
| 5,501,945 | 3/1996 | Kanakkanatt | 430/338 |

OTHER PUBLICATIONS

Amp, Inc., "AI–AMP–Fiber Optics, Introduction to Fiber Optic Networking–Fibers & Cables," Jul. 27, 1997.

NetOptics, Inc., "A Fiberoptic Cable Construction Information, Singlemode, Multimode, etc.," May 18, 1997.

Somjad Puangngern, "Report #2 Fiber Optics," Dec. 12, 1996.

*Primary Examiner*—John D. Lee

[57] ABSTRACT

A fiber optic cable having stress indicating means and a method for making same. The stress indicating means provides a cost effective method for determining whether an optical cable has been bent, stressed or otherwise mishandled, which may cause optical loss when the cable is placed in service. Broadly stated, the fiber optic cable according to the instant invention includes an optical fiber, comprised of a core and a cladding and a stress indicator concentrically disposed about the fiber that changes color when subjected to stress. A technician can thereby visually identify cables that have been bent or mishandled and subject them to testing before installation.

29 Claims, 3 Drawing Sheets

OPTICAL FIBER CABLE PRODUCTS HAVING A STRESS INDICATING CAPABILITY AND PROCESS FOR MAKING SAME

BACKGROUND OF THE INVENTION

1. Field of the Invention

The present invention relates generally to the field of optical fiber waveguides, and more particularly to a means for determining when an optical fiber waveguide has been mishandled and potentially damaged.

2. Description of Related Art

With the demand for high speed, multi-media services constantly increasing, fiber optic technology is gaining increased attention as communication service providers design their networks to carry high bandwidth signals. Fiber optic technology is so attractive because of the tremendous bandwidth capability of light transmission. Light in the visible and near visible spectrum has characteristic frequencies exceeding hundreds of gigahertz (GHz) allowing information transmission at rates unattainable by traditional, twisted-pair technology.

In addition to their high bandwidth, optical fibers offer several advantages over copper-based transmission media: Fiber optic media have very low loss characteristics, particularly when compared to metallic media. Fiber optic cables are essentially immune to electromagnetic interference and do not generate any electromagnetic fields to interfere with other equipment. Inasmuch as fiber optic cables are nonconducting, they do not load electrical equipment—instead, the cables act as an optoisolator. Furthermore, fiber optic cables are small and lightweight and can be installed where twisted-pair copper wires will not fit. Lastly, optical fiber, despite its significant performance advantage, is price competitive with high-end twisted pair cable.

While these advantages are impressive, optical fibers do have some disadvantages. First, complex and oftentimes expensive interface equipment is generally required to convert between the electronic and optical domains for transfenring signals to the optical fiber and receiving signals from the optical fiber. As technology continues to advance, however, the disadvantage in terms of cost and complexity for optical interface equipment should be insignificant. Second, fiber optic cables must be treated with care during handling and installation to avoid damaging the waveguide. It has long been believed that the fiber itself is very fragile because it is made of glass. This belief, however, is false. Modern optical fibers have tensile strength ratings ranging from 600,000–800,000 pounds per square inch. Nevertheless, optical fibers are highly susceptible to damage when bent. Indeed, technicians or packaging personnel used to handling copper wire are often unaware or forgetful of the strict bending requirements that must be followed when working with fiber optic cables. For example, pulling wires around corners is acceptable for copper, but could severely damage fiber. Unfortunately, the damage caused by bending a fiber optic cable is essentially undetectable via visual inspection. It is not until the cable is installed or testing equipment is applied that the losses can be detected. Testing every cable or jumper before use is an expensive proposition in terms of both the equipment required and the technician's time involved.

Thus, what is sought is a cost effective mechanism for visually identifying when a fiber optic cable has been bent or handled roughly that would provide an early indication that the fiber may suffer from increased optical loss.

SUMMARY OF THE INVENTION

Certain objects, advantages and novel features of the invention will be set forth in the description that follows and will become apparent to those skilled in the art upon examination of the following or may be learned with the practice of the invention.

The present invention is generally directed to a fiber optic cable having stress indicating means and a method for making same. The stress indicating means provides a cost effective method for determining whether an optical cable has been bent, stressed or otherwise mishandled, which may cause optical loss when the cable is placed in service. Broadly stated, the fiber optic cable according to the instant invention includes an optical fiber, comprised of a core and a cladding, and a stress indicator concentrically disposed about the fiber that changes color when subjected to stress. By examining the color of the stress indicator, a technician can visually identify cables that have been bent or mishandled and subject them to testing before installation.

According to one aspect of the invention, the stress indicating means is a layer of multi-phase material, examples of which include polyolefins, properly cooled nylon and selected polymers.

According to another aspect of the invention, the stress indicator is concentrically disposed about the jacket of a generic cable or cord providing similar stress identification benefits.

Additional advantages will become apparent from a consideration of the following description and drawings:

BRIEF DESCRIPTION OF THE DRAWINGS

Other features of the present invention will be more readily understood from the following detailed description of specific embodiments thereof when read in conjunction with the accompanying drawings, in which.

DESCRIPTION OF THE PREFERRED EMBODIMENT

Figure 1:
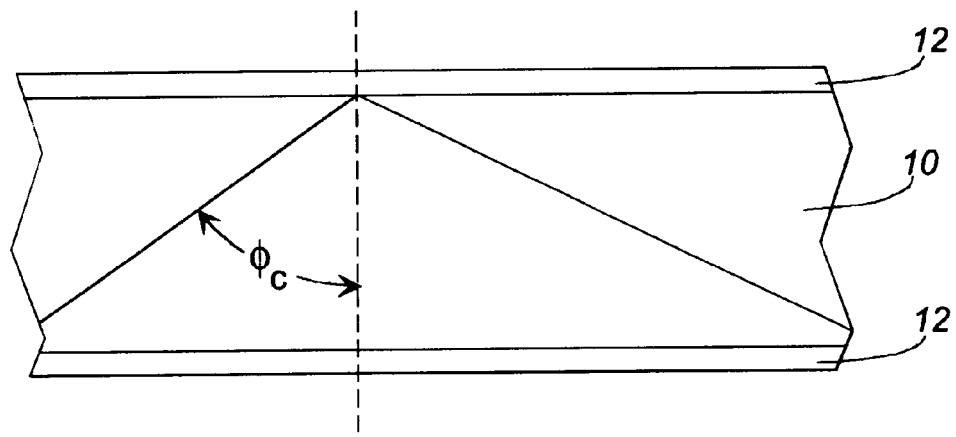
FIG. 1 is a diagram of light transmission through an optical fiber.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Optical fibers serve as a medium for transmitting light by virtue of a phenomenon known as total internal reflection. As illustrated in FIG. 1, the basic fiber optic element comprises a glass or sometimes plastic core 10 that is enveloped by an outer concentric shell or cladding 12.

Cladding 12 is generally made from glass and has a relatively low index of refraction with respect to core 10. Because of the difference in the index of refraction between the two materials, light rays striking cladding 12 at an angle greater than or equal to the critical angle ($\phi_c$) will be reflected back into core 10 at an angle of reflection equal to the angle of incidence. Inasmuch as the angles of incidence and reflection are equal, the light ray will continue to zig-zag down the length of the fiber. If a light ray strikes cladding 12 at an angle less than the critical angle, however, the ray will be refracted and pass through cladding 12 thus escaping the fiber.

Figure 2:
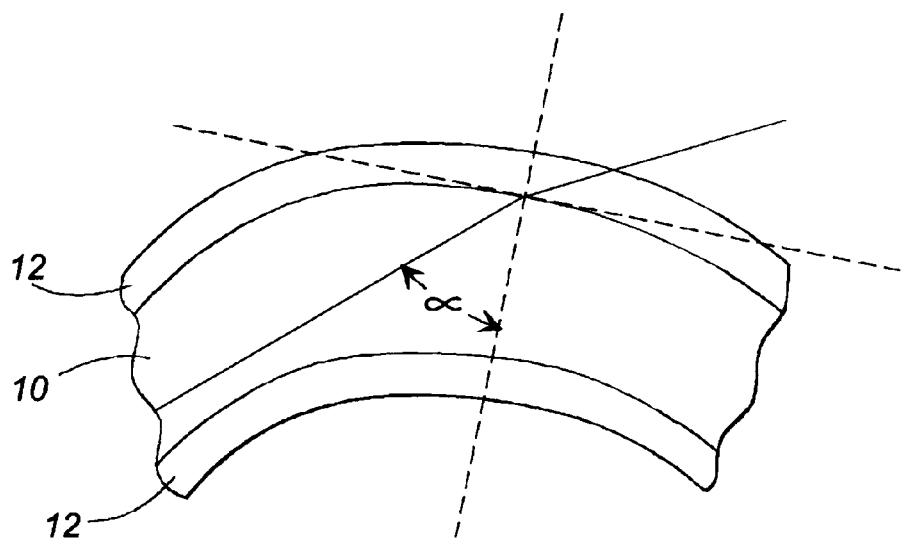
FIG. 2 is a diagram illustrating optical loss when an optical fiber is bent.

FIG. 2 illustrates the adverse effects that bending can have on an optical fiber. In the example shown, the light ray would normally strike cladding 12 at an incident angle greater than $\phi_c$; however, the bending of the fiber causes the light ray to strike cladding 12 at an angle $\alpha$ that is less than $\phi_c$ causing the light ray to refract and escape the fiber. While it may appear that the fiber can be straightened to correct the problem, that unfortunately is not possible. When the fiber is bent, kinks are introduced into the interface between core 10 and cladding 12. Whenever light rays strike these kinks, they are susceptible to escaping the fiber if the angle of incidence is less than the critical angle. As discussed hereinbefore this problem is even more troublesome in that it is virtually undetectable unless testing equipment is applied to the cable or the cable is installed and the service is noticeably degraded. Accordingly, the present invention provides a stress indication means by which customers and installers can visually identify cables that have been bent or treated roughly and should therefore be tested before being installed into a communication network.

Figure 3:
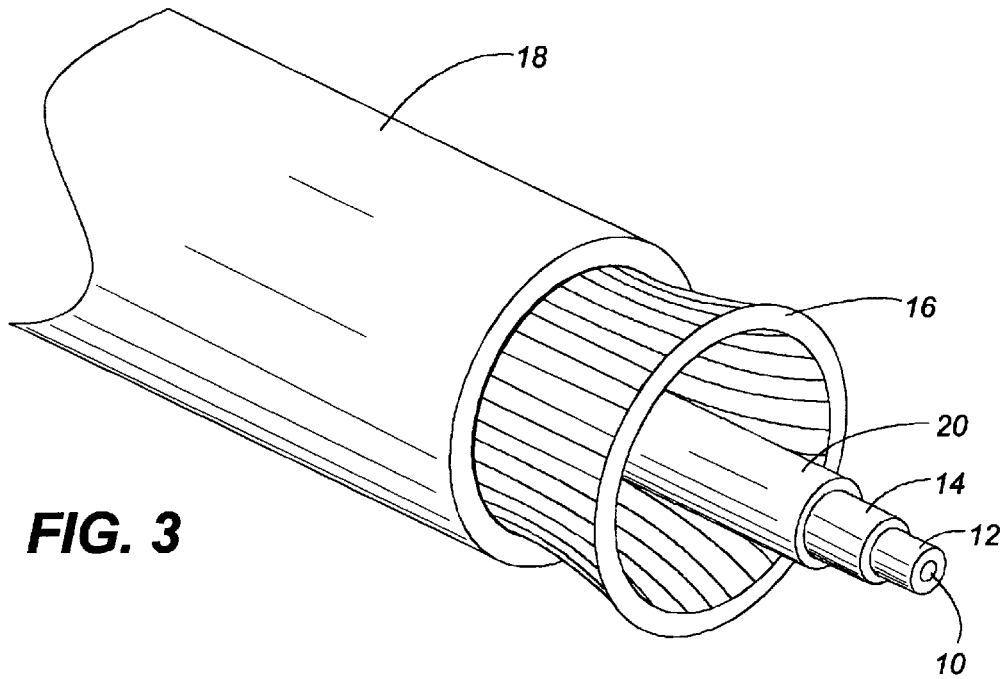
FIG. 3 is a perspective view of a tight-buffered optical cable incorporating stress indicating means internal to the outer jacket according to the present invention.

Fiber optic cables generally come in two varieties: tight-buffered cables and loose-tube cables. An exemplary tight-buffered fiber optic cable embodying the principles of the present invention is shown in FIG. 3. The cable is comprised of several concentric layers enveloping one another in a cumulative fashion. At the center of the cable is an optical fiber comprised of core 10 and cladding 12 as discussed in the foregoing. The optical fiber comes in a variety of sizes typically identified using the following convention: core outer diameter/cladding outer diameter. A typical size for a single-mode fiber (i.e., a fiber containing only a single path for a light ray to travel) is 9/125 $\mu$m while multimode fibers are common in 50/125 $\mu$m, 62.5/125 $\mu$m and 100/140 $\mu$m sizes. Although not illustrated, cladding 12 is generally coated with an acrylic material cured by ultra-violet (UV) radiation to protect the glass fiber from dust and scratches. Surrounding cladding 12 is a thermoplastic buffer 14 providing protection and forming what is commonly referred to as a "buffered fiber." The outside diameter of buffet 14 is typically 900 $\mu$m, which is a common standard for many connectors and splicing tools. Traditional cables are generally completed with a layer of aramid strength material 16 and an outer jacket of polyvinyl chloride (PVC) 18. The aramid strength material typically comprises a KEVLAR® yarn, which provides crush resistance and withstands the tensile stresses applied to the cable. Outer jacket 18 is designed to protect against environmental hazards such as abrasion, oil, solvents and other contaminates. In addition, the jacket generally defines the cable's duty and flammability rating. Obviously, heavy-duty cables will have thicker and tougher jackets than light-duty cables.

In addition to the layers discussed in the foregoing, the fiber optic cable according to the present invention includes a layer of stress indicating material 20 between buffer 14 and aramid strength material 16. Broadly stated, stress indicating material 20 should be made from a multi-phase material. That is, a homogenous material capable of existing in physically distinct domains or states and whose opacity differs between the domains. Materials satisfying this criterion include the following: polyolefins (e.g., polyethylene, polypropylene, polybutene), nylon materials properly cooled (i.e., quenched or annealed) after extrusion, polymethylmethacrylates, polystyrenes, and styrene-acrylonitrile polymers (e.g., acrylonitrile-butadient-styrene polymers). These materials all exhibit the property that physical stretching or bending causes a phase change from one domain to another resulting in a change in opacity and therefore color. When nylon is used, it may be desirable to cool the material via quenching for some applications while annealing will be preferred for other applications. The cooling process chosen will be the one that enhances the qualities desired for the given application (e.g., color, durability, rigidity, etc.). Preferably, the multi-phase material chosen will be one that undergoes an irreversible phase change under stress. If the material returned to its original color after the stress was removed, the aim of providing a visual indicator that identifies potentially damaged products would be defeated.

In the example shown, stress indicating material 20 is co-extruded on top of buffer 14. As discussed earlier, buffered fibers generally have a standardized outer diameter of 900 $\mu$m to adapt to splicing and connector equipment. Thus, stress indicating material 20 should be very thin, preferably in the range of 1-4 $\mu$m, to allow the buffered fiber to still comport with the tolerances allowed by the aforementioned equipment. In addition, buffered fibers are frequently color coded to distinguish, for example, between transmit and receive functions. Therefore, stress indicating material 20 is preferably transparent or displays the appropriate color in accordance with any color coding protocol when unstressed. Alternatively, buffer 14 itself could be manufactured from a stress indicating material and layer 20 eliminated. In this case, the multi-phase material chosen should be rugged enough to provide physical protection for the enclosed fiber in addition to changing color when placed under stress.

When installing or manipulating fiber optic cables or jumpers, the layers outside buffer 14 are typically stripped away leaving the buffered fiber to undergo potentially the roughest treatment during splicing and connecting. For that reason, the most common application for the present invention will be in providing stress indication for the buffered fiber, either by using stress indicating material for the buffer layer itself or by extruding a thin layer of stress indicating material outside of the buffer.

Figure 4:
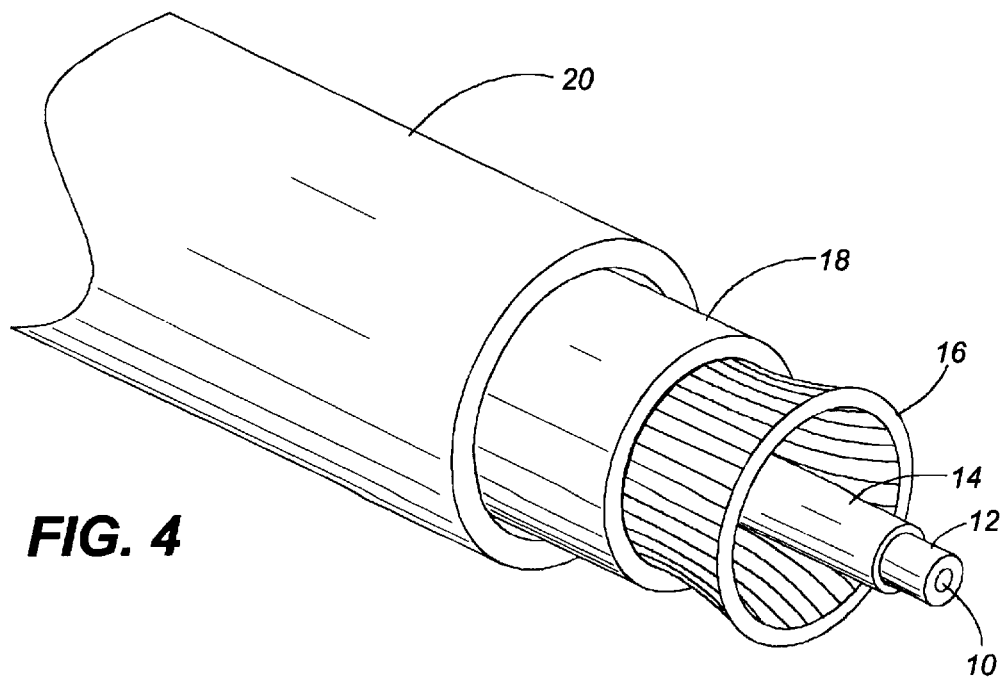
FIG. 4 is a perspective view of a tight-buffered optical cable incorporating stress indicating means external to the outer jacket according to the present invention.

Nevertheless, it will be appreciated by those skilled in the art that the principles of the present invention are applicable to a variety of embodiments of fiber optic cable. FIG. 4 illustrates the same tight-buffered cable depicted in FIG. 3; however, in this instance, stress indicating material 20 is extruded onto the outside of outer jacket 18. Inasmuch as outer jacket 18 is usually made from PVC and is designed to provide protection from the surrounding environs, the durability of the multi-phase material chosen for stress indicating material 20 need not be a consideration. On the other hand, outer jacket 18 could be eliminated and stress indicating material 20 extruded directly over aramid strength material 16 to fulfill both the stress indication and cable protection roles. In that configuration, a highly durable multi-phase material should be chosen to provide adequate protection for the enclosed fiber.

Clearly the embodiments of FIG. 3 and FIG. 4 can be combined in which a stress indicating layer is provided for both the buffered fiber and the cable as a whole to detect possible mishandling of the cable or the buffered fiber after the outer layers have been stripped.

Figure 5:
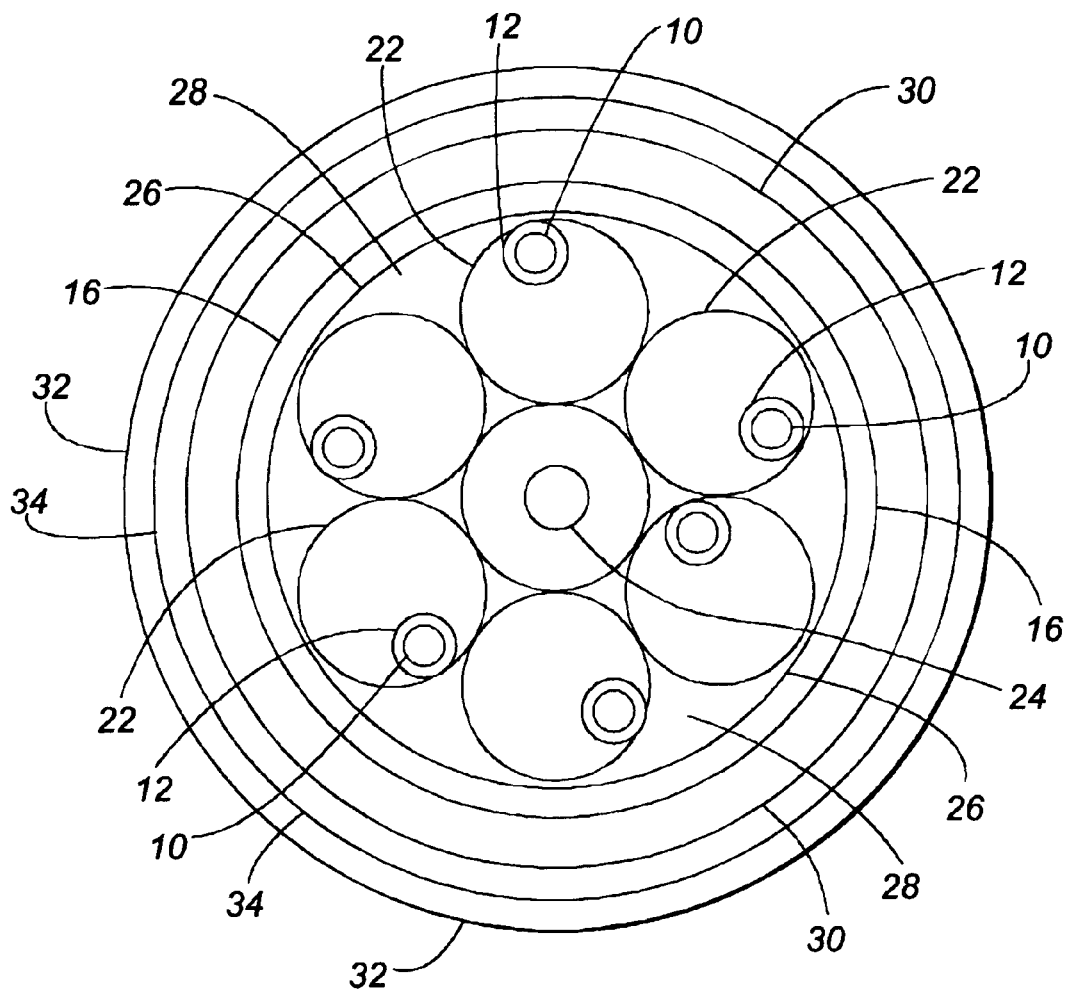
FIG. 5 is an elevation view of a loose-tube optical cable incorporating stress indicating means according to the present invention.

A loose-tube type of fiber optic cable is shown in FIG. 5. This type of cable is commonly installed outdoors or in harsh environments whereas the tight-buffered cable discussed in the foregoing is generally used for making internal connections inside a building. The loose tube cable employs a modular design in which several fibers comprising a core 10 and a cladding 12 are held in a stress indicating buffer tube 22 (only one fiber per tube is illustrated). The tube is generally filled with a gel that provides protection from moisture. According to the present invention, the buffer tube is comprised of a stress indicating material that would provide a visual indication of when the fibers contained therein have been stressed or bent as discussed hereinbefore. The buffer tube serves merely to confine a collection of fibers and therefore does not have any strict thickness or dimension requirements. The stress indicating material chosen for the buffer tube should be dimensioned to hold the number of fibers that will be grouped together in the tube, should be capable of conforming to any color coding convention that may be required, and, in conjunction with the remaining components of the cable, should provide adequate protection for the fibers. Alternatively, a layer of stress indicating material (not shown) could be extruded onto the thermoplastic buffer tube to accomplish the same result. The remainder of the cable is designed with primary emphasis on withstanding the rigors of outdoor deployment. Buffer tubes 22 coil around central member 24, which is typically a steel wire or dielectric to act as reinforcement. The combination of buffer tubes 22 and central member 24 are held together by thermoplastic binder 26. Binder 26 is filled with an interstitial filling 28 to fill in the empty space between buffer tubes 22. For tensile strength, a layer of aramid strength material 16, as discussed earlier is disposed about binder 26. An inner jacket 30 and outer jacket 32, both made from PVC and separated by a layer of steel tape 34, provide sturdy protection from the outside elements. It may be desirable to extrude a layer of stress indicating material onto outer jacket 32 or manufacture outer jacket 32 from a stress indicating material; however, because of the bulk, strength and rigidity of the loose-tube cable, bending is normally not a problem until the outer layers are stripped and the individual buffer tubes 22 are handled to distribute or fan out the fibers to individual connectors. Therefore, buffer tubes 22 and binder 26 are the most likely candidates for use of the stress indicating material in a loose-tube cable.

The principles of the present invention have been described with reference to tight-buffered and loose-tube fiber optic cables. From the foregoing, it can readily be seen that the cables incorporating a stress indicating layer provide a cost effective solution for evaluating when a cable has been bent or mishandled and, as a consequence. requires further testing to determine if it is still usable. Moreover, it will be appreciated by those skilled in the art that these principles can be applied outside of the fiber optic arena. A layer of stress indicating material can be extruded onto or as part of other elongated cables, cords, jumpers or wires. It should also be recognized that the type of multi-phase material chosen as a stress indicator for a given application will be based on several engineering parameters. The following factors will routinely be considered: 1) Are there any size limitations? 2) Are there any color coding/transparency requirements? 3) Does the material need to provide protection or strength along with stress indication? 4) What is the expense of the stress indicating material? 5) What is the expense involved in performing an additional step of extrusion? These factors should also be considered when deciding whether to manufacture or replace an existing layer of a cable or cord with a stress indicating material or whether to extrude an additional layer of stress indicating material thereon.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims. Further, in the claims hereafter, the corresponding structures, materials, acts, and equivalents of all means or step plus function elements are intended to include any structure, material, or acts for performing the functions with other claimed elements as specifically claimed.

We claim:

1. A fiber optic cable, comprising:
   an optical fiber, said fiber comprising a core and a cladding concentrically disposed about said core; and
   a layer of multi-phase material concentrically disposed about said cladding, said multi-phase material irreversibly changing color when subjected to stress.

2. The fiber optic cable of claim 1, further comprising a protective layer interposed between said multi-phase material and said cladding.

3. The fiber optic cable of claim 1, further comprising a protective layer concentrically disposed about said multi-phase material.

4. The fiber optic cable of claim 1, wherein said multi-phase material is a polyolefin.

5. The fiber optic cable of claim 1, wherein said multi-phase material is quenched nylon.

6. The fiber optic cable of claim 1, wherein said multi-phase material is annealed nylon.

7. The fiber optic cable of claim 1, wherein said multi-phase material is a polymer selected from the group consisting of polymethylmethacrylate, polystyrene and styrene-acrylonitrile polymers.

8. A fiber optic cable, comprising:
   a core;
   a cladding concentrically disposed about said core, said cladding being coated with a radiation cured acrylic material;
   a buffer concentrically disposed about said acrylic coated cladding;
   stress indicating means comprising a layer of multi-phase material concentrically disposed about said buffer, said multi-phase material changing color when subjected to stress;
   a layer of strengthening material concentrically disposed about said stress indicating means.

9. The fiber optic cable of claim 8, further comprising: a
   jacket concentrically disposed about said layer of strengthening material; a
   second layer of stress indicating means comprising a layer of multi-phase material concentrically disposed about said jacket, said second layer of multi-phase material changing color when subjected to stress.

10. The fiber optic cable of claim 9, wherein said buffer is a layer of thermoplastic material, said strengthening material is aramid yarn and said jacket is a layer of PVC.

11. The fiber optic cable of claim 10, wherein said multi-phase material is a polyolefin.

12. The fiber optic cable of claim 10, wherein said multi-phase material is quenched nylon.

13. The fiber optic cable of claim 10, wherein said multi-phase material is annealed nylon.

14. The fiber optic cable of claim 10, wherein said multi-phase material is a polymer selected from the group consisting of polymethylmethacrylate, polystyrene and styrene-acrylonitrile polymers.

15. A stress indicator for use on a jacketed cable, comprising:
- a layer of multi-phase material concentrically disposed about a jacket of the jacketed cable, said multi-phase material irreversibly changing color when subjected to stress.

16. The stress indicator of claim 15, wherein said multi-phase material is a polyolefin.

17. The stress indicator of claim 15, wherein said multi-phase material is quenched nylon.

18. The stress indicator of claim 15, wherein said multi-phase material is annealed nylon.

19. The stress indicator of claim 15, wherein said multi-phase material is a polymer selected from the group consisting of polymethylmethacrylate, polystyrene and styrene-acrylonitrile polymers.

20. A fiber optic cable, comprising:
- an optical fiber, the fiber comprising a core, a cladding concentrically disposed about said core, and a buffer layer concentrically disposed about said cladding; and
- stress indicating means comprising a layer of colored multi-phase material concentrically disposed about said buffer layer, said colored multi-phase material irreversibly changing color when subjected to stress.

21. The fiber optic cable of claim 20, wherein said colored multi-phase material is a polyolefin.

22. The fiber optic cable of claim 20, wherein said colored multi-phase material is quenched nylon.

23. The fiber optic cable of claim 20, wherein said colored multi-phase material is annealed nylon.

24. The fiber optic cable of claim 20, wherein said colored multi-phase material is a polymer selected from the group consisting of polymethylmethacrylate, polystyrene and styrene-acrylonitrile polymers.

25. The fiber optic cable of claim 20, further comprising:
- a protective layer concentrically disposed about said stress indicating means; and
- a second layer of stress indicating means comprising a layer of colored multi-phase material concentrically disposed about said protective layer, said second layer of colored multi-phase material changing color when subjected to stress.

26. The fiber optic cable of claim 25, wherein said colored multi-phase materials are polyolefin.

27. The fiber optic cable of claim 25, wherein said colored multi-phase materials are quenched nylon.

28. The fiber optic cable of claim 25, wherein said colored multi-phase materials are annealed nylon.

29. The fiber optic cable of claim 25, wherein said colored multi-phase materials are a polymer selected from the group consisting of polymethylmethacrylate, polystyrene and styrene-acrylonitrile polymers.

\* \* \* \* \*